US010364800B2

(12) United States Patent
Joss et al.

(10) Patent No.: US 10,364,800 B2
(45) Date of Patent: Jul. 30, 2019

(54) ASSEMBLY SYSTEM AND METHOD FOR ASSEMBLING A TOWER FOR A WIND GENERATOR

(71) Applicant: SOLETANCHE FREYSSINET, Rueil Malmaison (FR)

(72) Inventors: Beat Joss, Bäriswil (CH); Nicolas Fabry, Antony (FR); Benoît Melen, Bois-Colombes (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 180 days.

(21) Appl. No.: 15/311,106

(22) PCT Filed: May 19, 2014

(86) PCT No.: PCT/FR2014/051158
§ 371 (c)(1),
(2) Date: Nov. 14, 2016

(87) PCT Pub. No.: WO2015/177413
PCT Pub. Date: Nov. 26, 2015

(65) Prior Publication Data
US 2017/0241407 A1 Aug. 24, 2017

(51) Int. Cl.
*B66D 3/20* (2006.01)
*E04H 12/34* (2006.01)
(Continued)

(52) U.S. Cl.
CPC ............... *F03D 13/10* (2016.05); *B66D 3/20* (2013.01); *E04H 12/342* (2013.01);
(Continued)

(58) Field of Classification Search
CPC ..... E04H 12/342; E04H 12/344; F03D 13/10; F03D 13/20; B66D 3/20; F05B 2230/61; F05B 2240/912; F05B 2240/916
See application file for complete search history.

(56) References Cited

U.S. PATENT DOCUMENTS 8,297,025 B2 * 10/2012 Huynh Tuong ......... E04H 12/02
52/745.17
8,578,679 B1 * 11/2013 Petricio Yaksic ....... E04H 12/28
52/745.17
(Continued)

FOREIGN PATENT DOCUMENTS

EP 2374966 A1 10/2011
EP 2712985 A1 * 4/2014 ........... E04H 12/344
(Continued)

OTHER PUBLICATIONS

International Search Report from PCT/FR2014/051158, dated Jul. 4, 2015.

*Primary Examiner* — Christine T Cajilig
(74) *Attorney, Agent, or Firm* — Dentons US LLP

(57) ABSTRACT

The invention has for object a system for assembling a tower for a wind generator consisting of a plurality of blocks, comprising:
a structure for lifting each one of said blocks, and
a structure for supporting said lifting structure, the lifting structure being moveable in relation to the support structure between a block-gripping position and a block-holding position, the lifting structure comprising a body for gripping each block.

20 Claims, 7 Drawing Sheets

(51) Int. Cl.
  *F03D 13/10* (2016.01)
  *F03D 13/20* (2016.01)

(52) U.S. Cl.
  CPC .......... *E04H 12/344* (2013.01); *F03D 13/20* (2016.05); *F05B 2230/61* (2013.01); *F05B 2240/912* (2013.01); *Y02E 10/728* (2013.01); *Y02P 70/523* (2015.11)

(56) References Cited

U.S. PATENT DOCUMENTS

| | | | | |
|---|---|---|---|---|
| 8,601,748 | B2* | 12/2013 | Delago | F03D 13/10 52/119 |
| 9,366,456 | B2* | 6/2016 | Montresor | E04H 12/342 |
| 9,556,636 | B2* | 1/2017 | Zavitz | F03D 13/10 |
| 2009/0087311 | A1* | 4/2009 | Wyborn | E04H 12/08 416/9 |
| 2010/0281818 | A1* | 11/2010 | Southworth | E02D 27/42 52/745.17 |

FOREIGN PATENT DOCUMENTS

| | | | |
|---|---|---|---|
| GB | 2502299 | A | 11/2013 |
| WO | 2011055021 | A2 | 5/2011 |

\* cited by examiner

ASSEMBLY SYSTEM AND METHOD FOR ASSEMBLING A TOWER FOR A WIND GENERATOR

This application is a National Stage Application of International Application No. PCT/FR2014/051158 filed May 19, 2014, which is hereby incorporated by reference in its entirety.

The invention has for object a system for assembling a tower for a wind generator consisting of a plurality of blocks.

Typically, such a tower is surmounted by a nacelle and by a rotor comprised of several blades in order to form the wind generator.

A well-known system for assembling implements a crane that stacks the blocks of the tower one on top of the other, before placing the nacelle and the rotor on the highest block of the tower.

However, the use of cranes is expensive and making them available may not be possible, according to the sites where the tower is to be set up.

In addition, it is not rare for the blocks to be damaged when they are being manipulated by the cranes.

In order to overcome these disadvantages, it is known from document US 2011/0239584 to have recourse to a support structure comprising an upper portion and a lower portion arranged respectively above and below a platform.

Each block of the tower is mounted around the lower portion of the support structure by the fastening of several panels in a hollow actuator.

The support structure comprises two cables of which one end is fastened to the platform. The other end of each one of the cables is fastened to a grip arranged inside the block mounted around the support structure.

Each cable is then drawn so that the end fastened to the block rises along the lower portion of the support structure.

Such a system for assembling has the disadvantage that the displacement of the block secured with the cables is delicate and sometimes dangerous, in particular in the event of strong wind, since there may be a horizontal offset of the block and a tipping of the tower.

It may then be required to provide devices for sliding, of the Teflon pad type for example, between the inside of the block and the support structure.

However, the direct contact between the devices for sliding and the blocks frequently produces damage to the blocks when they are assembled by the system for assembling.

In addition, such a system for assembling is adapted to cylindrical towers only, and cannot be used for another shape of tower, in particular for a truncated shape.

The purpose of the invention is to overcome these disadvantages at least partially.

To this effect, the invention has for object a system for assembling a tower for a wind generator consisting of a plurality of blocks, comprising:

a structure for lifting each one of said blocks, and a structure for supporting said lifting structure, the lifting structure being moveable in relation to the support structure between a block-gripping position and a block-holding position, the lifting structure comprising a body for gripping each block.

Thanks to the system according to the invention, the block is held firmly during the displacement of the lifting structure.

According to another characteristic of the invention, the body for gripping comprises at least one rod able to penetrate into a recess of each block.

According to another characteristic of the invention, said at least one rod is retractable.

As such, the length of the rod can be adapted to several different diameters of the blocks, which makes it possible to mount a cylindrical or truncated tower for example.

According to another characteristic of the invention, the system for assembling comprises a plurality of rods arranged substantially in a same plane, and two adjacent rods form between them an angle of about 360° divided by the total number of rods, and preferably four rods, with two rods forming between them an angle of about 90°.

According to another characteristic of the invention, the system for assembling comprises at least one holding arm bearing laterally on the lifting structure on at least one block with which the lifting structure is secured.

According to another characteristic of the invention, the system for assembling comprises a plurality of holding arms arranged in the vicinity of a first end of the block and a plurality of holding arms arranged in the vicinity of a second end of the block.

According to another characteristic of the invention, the system for assembling comprises a device for guiding the lifting structure in the support structure.

According to another characteristic of the invention, the device for guiding comprises at least one element able to slide or roll along a rail of the support structure.

According to another characteristic of the invention, the device for guiding comprises two pairs of said elements, a first pair arranged in the vicinity of a first end of uprights of the lifting structure and a second pair arranged in the vicinity of a second end of said uprights.

According to another characteristic of the invention, the support structure comprises at least two pillars arranged parallel to one another.

According to another characteristic of the invention, the system comprises a motor means for the lifting structure in the structure support.

According to another characteristic of the invention, the motor means comprises at least one actuator with a cable or with a threaded bar or a rack device or a large stroke actuator.

According to another characteristic of the invention, the motor means comprises four cable actuators, with each cable being connected to an upright of the lifting structure and able to slide in relation to the support structure.

According to another characteristic of the invention, the system comprises a device for guiding the lifting structure in the support structure.

According to another characteristic of the invention, the support structure and/or the lifting structure comprises at least one stiffening rod.

The invention also has for object a method of assembling a tower for a wind generator consisting of a plurality of blocks, using a system for assembling comprising:

a structure for lifting each one of said blocks, and a structure for supporting said lifting structure, the lifting structure being moveable in the support structure between a block-gripping position and a block-holding position, the lifting structure comprising a body for gripping each block, the method for assembling comprising a step of:

gripping of a block of the tower by the body for gripping the lifting structure in the gripping position and displacement of the lifting structure from the gripping position to the holding position of the blocks.

According to another characteristic of the invention, in the step of displacing, the block is secured with the lifting structure.

According to another characteristic of the invention, the system for assembling is arranged in such a way that the direction of displacement of the guiding structure is a vertical direction, and wherein, in the block-holding position, the block secured with the body for gripping is held at a height that is higher than a height of the following block to be assembled.

According to another characteristic of the invention, the method for assembling comprises a step of depositing another block in the system for assembling, under the block secured with the body for gripping.

According to another characteristic of the invention, the method for assembling comprises a step of displacing the lifting structure from the holding position to the block positioned during the step of positioning, until the block secured with the body for gripping is in contact with the positioned block.

According to another characteristic of the invention, the method for assembling comprises a step of detaching of the body for gripping and of the block secured with the body for gripping during the step of gripping.

According to another characteristic of the invention, the method for assembling comprises a step of displacing the lifting structure to the gripping position.

According to another characteristic of the invention, the step of gripping consists in inserting a portion of a retractable rod into a recess of the block to be grasped.

According to another characteristic of the invention, the step of detaching consists in retracting a retractable rod until the portion of the rod inserted beforehand into the block is arranged outside of the block.

According to another characteristic of the invention, during each step of displacing the lifting structure in the support structure, the lifting structure is guided by the device for guiding.

Other characteristics and advantages of the invention shall further appear when reading the following description. The latter is purely for the purposes of information and must be read with respect to the annexed drawings wherein.

Figure 1:
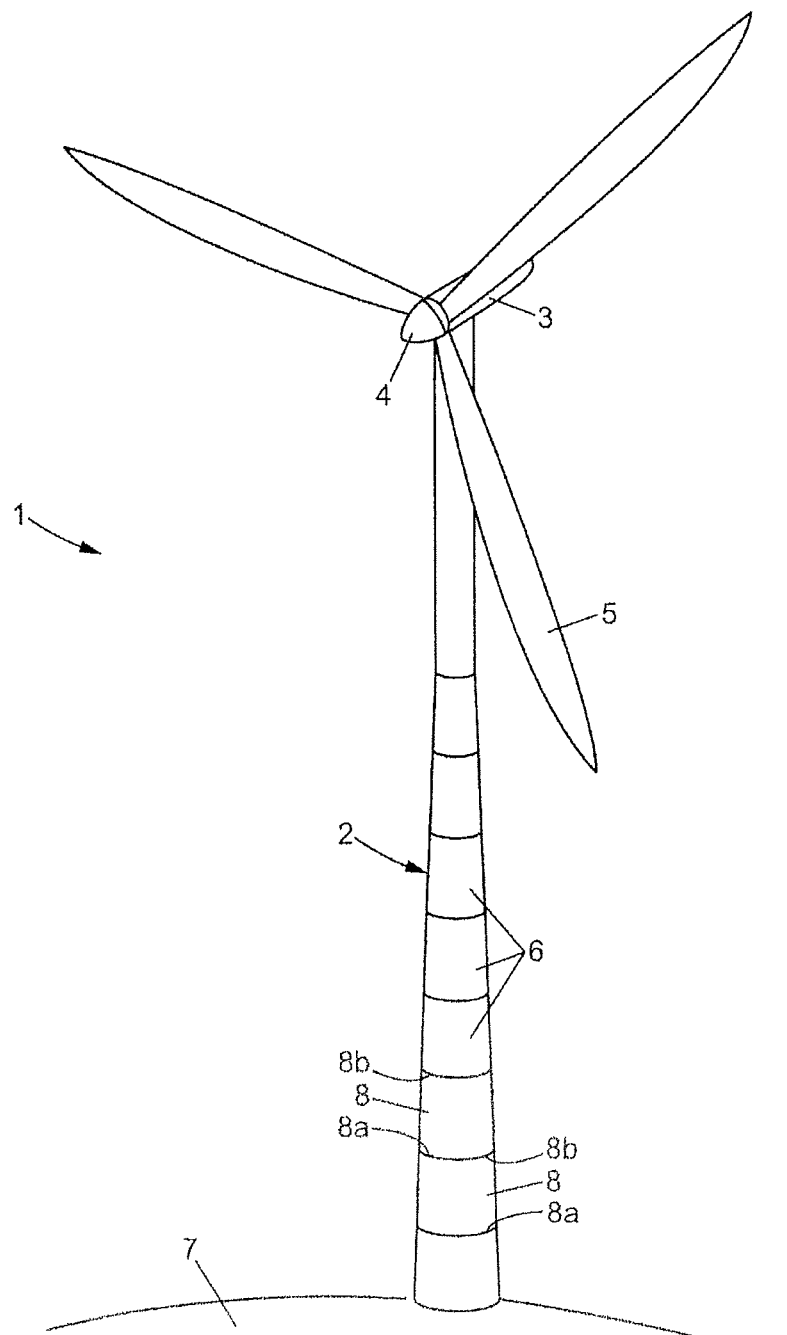
FIG. 1 shows a wind generator comprising a tower assembled according to this invention.

As shown in FIG. 1, a wind generator 1 comprises a tower 2 surmounted by a nacelle 3 and a rotor 4 that is comprised of several blades 5.

The tower 2 comprises a plurality of blocks 6 stacked one on top of the other, in such a way that the tower 2 has a general extended shape.

For the rest of the description, it is considered that the tower 2 extends in a vertical direction.

The tower 2 is rigidly secured with a base, that is sufficiently stable on a ground 7, not visible in FIG. 1.

Each block 6 is constituted from a material such as concrete.

Each block 6 has a general truncated shape, as can be seen in FIG. 1, or cylindrical, as can be seen in FIGS. 2 to 6.

Each block 6 comprises a lateral wall 8 limited by a so-called lower end 8*a* and an upper end 8*b*, with the lower end 8*a* of a given block 6 being in contact with the upper end 8*b* of the block 6 arranged underneath.

As shown in FIGS. 2 to 6, the tower 2 is assembled by a system for assembling 10, comprising:

a structure for lifting 11 each one of the blocks 6, and a structure for supporting 12 the lifting structure 11.

The structure for lifting 11 is able to be mobile in relation to the support structure 12 between a block-gripping position 6 and a block-holding position 6.

The structure for lifting 11 comprises a body for gripping 13 each block 6.

In the gripping position, the body for gripping 13 is arranged in the vicinity of the ground 7, while in the holding position, the body for gripping is arranged at a higher height, as details shall be provided hereinafter.

The direction of displacement of the body for gripping between the gripping position and the holding position extends in the direction of the extension of the tower 2, i.e. vertically.

As can be seen in FIGS. 2 to 6, the body for gripping 13 comprises at least one rod 14 able to penetrate into a recess E of each block 6.

In the FIGS. 2 and 3, the rod is a portion of a telescopic beam, as shall be explained hereinafter.

Figure 4:
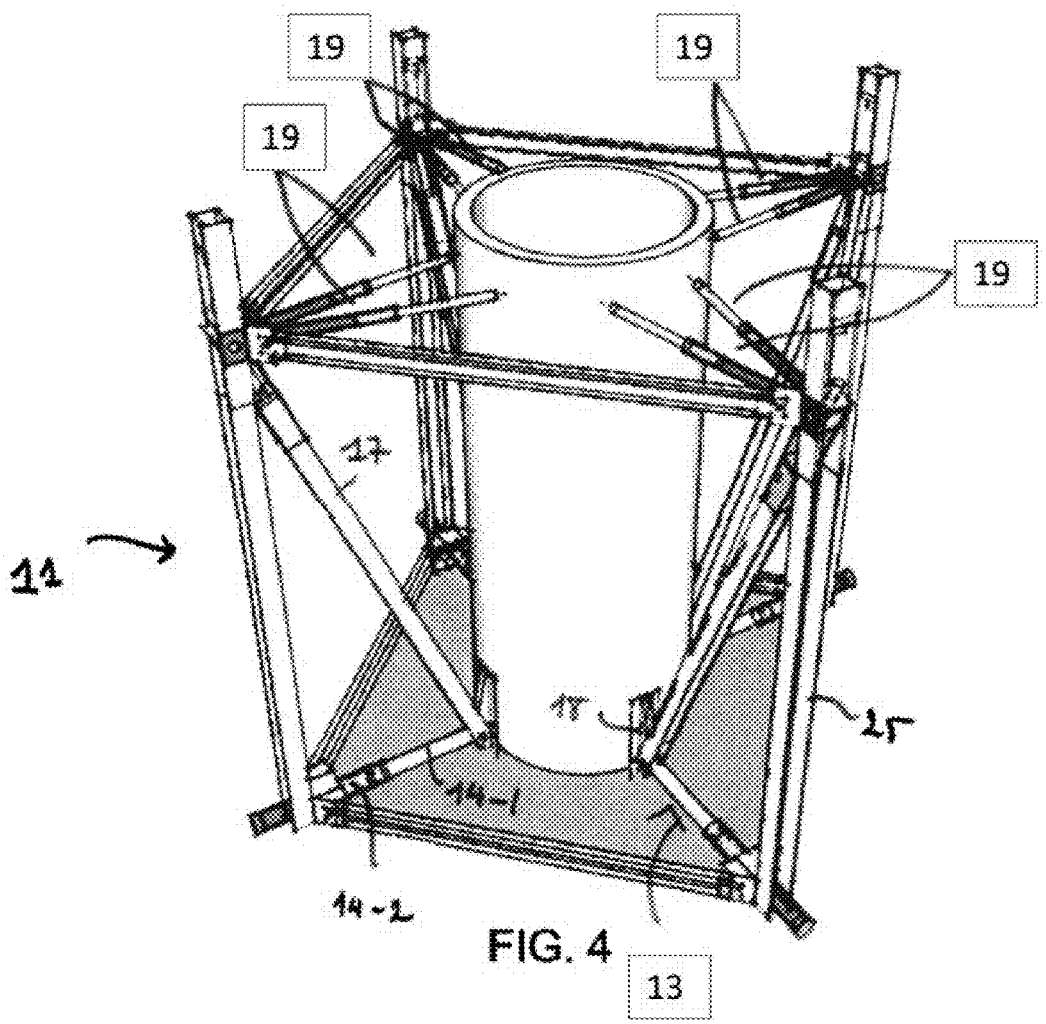
FIG. 4 shows a lifting structure of a system for assembling according to a second embodiment.

In FIG. 4, the rod is a portion of a actuator, as shall be explained hereinafter.

A recess E is advantageously arranged in the lower end 8*a* of the block 6.

As shown, the system 10 comprises a plurality of rods 14 arranged substantially in a same plane and, preferably, two adjacent rods form between them an angle of about 360° divided by the total number of rods.

In the embodiments shown, the body for gripping 13 comprises four rods 14 arranged substantially in the same plane P and forming an angle of about 90° two-by-two.

In the figures, the rods are referenced as 14*a*, 14*b*, 14*c*, 14*d*, in an anti-clockwise direction.

The plane P is orthogonal to the direction of displacement of the lifting structure 11 in the support structure, and is preferentially horizontal when the tower 2 is assembled in such a way as to be vertical.

This configuration of the rods 14*a* to 14*d* makes it possible to correctly stabilise the block 6 to be grasped during its displacement by the lifting structure 11, and in particular prevents the offsetting thereof due to a wind blowing horizontally on the system for assembling 10.

Each rod 14 can be retracted and has a length L in a continuous direction in the plane P which is changed according in particular to the diameter of the block 6 to be grasped.

Figure 2:
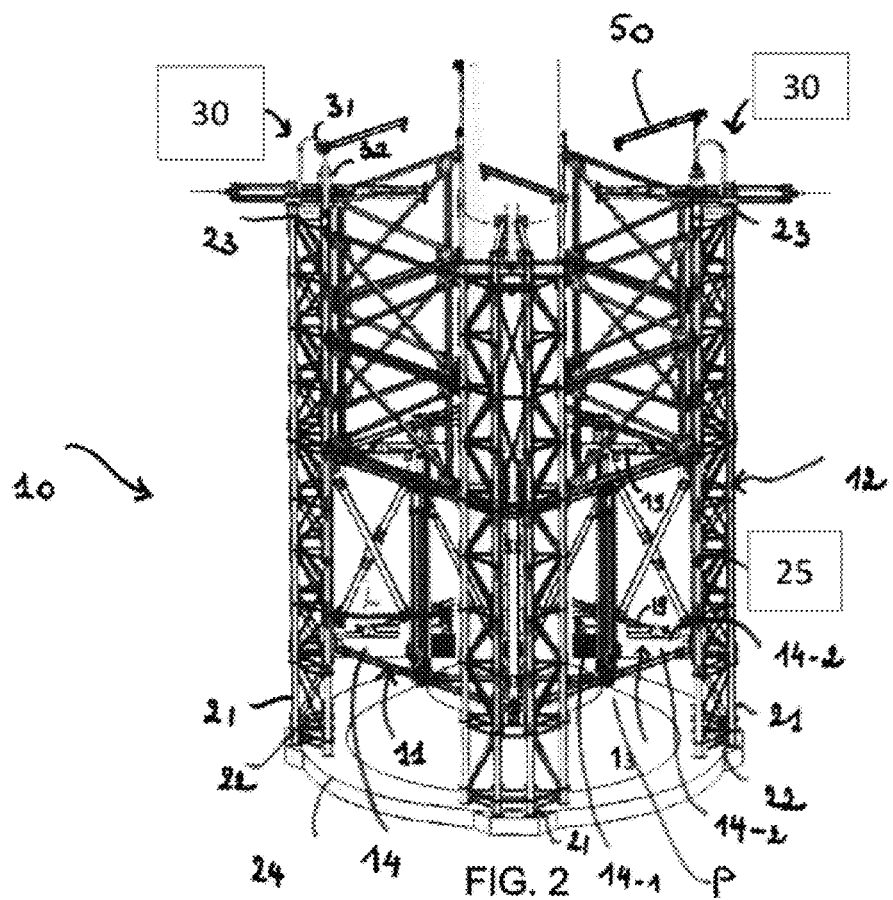
FIG. 2 shows a perspective view of a first embodiment of a system for assembling in a position of displacement of a block of the tower.
Figure 3:
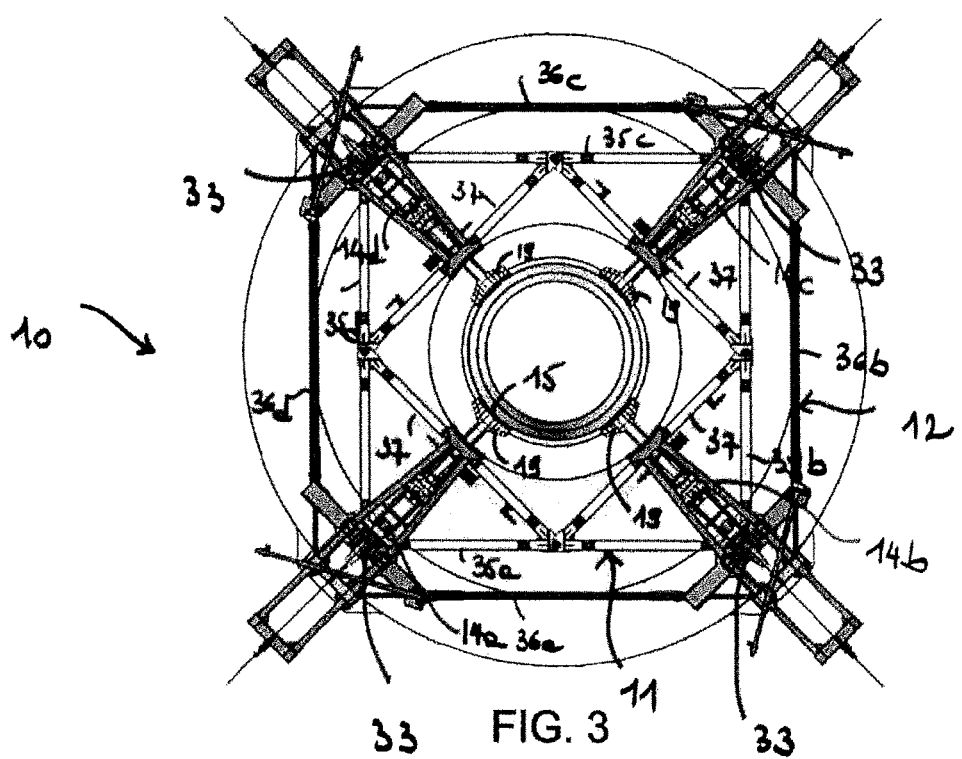
FIG. 3 shows a top view of the system for assembling of FIG. 2.

In the embodiment shown in FIGS. 2 and 3, each rod 14 is a telescopic beam, comprising a first portion of beam 14-1 and a second portion of beam 14-2. The first portion of beam 14-1 is able to be inserted into the second portion of beam 14-2. As such, according to the diameter of the block to be grasped, the first portion of rod penetrates more or less into the second portion of rod. The length L of the beam 14 is then the sum of the length of the second portion of beam and the length of the first portion of beam which is outside of the second portion of beam. The length L is held for example by the introduction of at least one axis or pin passing through each telescopic beam of the second portion of rod in one of the holes of the first portion of beam.

It is understood that the first end 15 of the beam 14 secured with the block 6 to be grasped is one of the ends of the first portion of rod. The other end 16 of the beam 14 is secured with the lifting structure 11, as details shall be provided hereinafter.

Preferentially, the beams 14 have a section of high value in order to be able to resist the forces of bending, traction and compression.

In the embodiment shown in FIG. 4, the body for gripping 13 comprises four actuators comprising a piston 14-1 mobile in a body 14-2.

In this embodiment, the rod is the piston 14-1 of which the length varies according to its penetration into the body 14-2 of the actuator.

A diagonal bar 17 is preferentially associated to each actuator 14 in order to take up the forces in traction, substantially vertical, and as such ensure that the actuator works only in compression.

A lug 18 secured with the moveable end 15 of the piston 14-1 holds the rod 14 in the recess E of the block 6.

For each one of the embodiments, due to the variable length L, the system for assembling 10 can be adapted to several different diameters of the blocks 6, which makes it possible to mount a cylindrical or truncated tower for example.

More preferably, for a given block 6, the lengths of all of the beams 14 are identical.

As can be seen particularly in FIGS. 3 and 4, the lifting structure 11 comprises holding arms 19.

In FIG. 3, each holding arm 19 comprises a longitudinal portion and an abutment portion bearing laterally on the block 6 secured with the lifting structure 11.

Preferably, the lifting structure 11 comprises four holding arms, with each one of these holding arms being arranged above and in the vicinity of the beam 14 and the longitudinal portion extending parallel to the beam 14.

The structure for lifting 11 advantageously comprises four other holding arms, arranged at the end 8b of the block 6.

Possibly, the holding arms bear on a plurality of blocks.

Alternatively, as shown in FIG. 4, the lifting structure 11 comprises a plurality, for example four pairs, of actuators forming the holding arms 19 of the lifting structure on the block 6.

As such, the rods 14 and the holding arms 19 constitute the only interfaces between the lifting structure 11 and each block 6 with which it is secured.

The support structure 12 comprises at least two pillars 21 arranged parallel to one another.

In the FIGS. 2 to 5, the support structure 12 comprises four pillars 21 extending in a direction parallel to the direction of the tower 2, i.e. a vertical direction.

The pillars 21 are rigidly fastened by one 22 of their ends 22, 23, to the base 24, preferentially made of concrete.

The base 24 is sufficiently stable on the ground of the site where the tower 2 is to be set up.

The ends 22 are arranged in relation to one another in such a way as to form the four corners of a rectangle or of a virtual square.

The structure for lifting advantageously comprises at least four uprights 25, each upright extending parallel to one of the pillars 21.

As can be seen in FIGS. 2 to 5, the rods are secured by their end 16 with one of the uprights 25 of the lifting structure 11, with each rod being associated to one of the uprights 25. The other end 15 of each rod 14 is able to be arranged inside the block 6 to be grasped when the block 6 has to be assembled, as already explained.

As such, the rods 14a to 14d are aligned two-by-two, in such a way as to form two discontinuous diagonals of the rectangle or square of the uprights of the lifting structure 11.

In other terms, as can be seen in figures, the ends 15 and 16 of the beams 14a and 14c are aligned.

Likewise, the ends 15 and 16 of the beams 14b and 14d are aligned.

The system for assembling 10 comprises a motor means 30 of the lifting structure 11 in the structure support 12.

The motor means comprises for example at least one actuator with a cable or with a threaded bar or a rack device or a large stroke actuator.

In the figures, the motor means 30 comprises four cable actuators, with each cable 31 being connected to one of the rods and able to slide in relation to the support structure 12, in one of the pillars 21 or in the vicinity of one of these pillars 21.

A control means 32 actuates the cable 31.

Each cable 31 is anchored on the lifting structure, preferably in the vicinity of an end of one of the portions or rod or beam 14.

In the FIGS. 2 to 5, the system for assembling 10 comprises four cables 31, with a cable 31 being introduced into one of the pillars 21.

Each cable 31 is secured by one 33 of its ends, with the rod 14 associated to the pillar 21 wherein the cable 31 is introduced or preferably with the upright 25 with which the rod 14 is secured.

The structure for lifting 11 comprises at least one stiffening rod 35, said bar 35 extending between two uprights of the lifting structure 11.

The support structure 12 comprises at least one stiffening rod 36 arranged between two pillars 21.

As can be seen in FIGS. 2 to 5, the lifting structure 11 comprises four stiffening bars 35a, 35b, 35c, 35d, with two adjacent bars forming between them an angle substantially of 90°.

As can be seen in FIGS. 2 to 5, the support structure 10 comprises four stiffening bars 36a, 36b, 36c, 36d, with each one of the stiffening bars 35 being arranged parallel to one of the stiffening bars 36.

Advantageously, the lifting structure 11 and/or the support structure 12 comprises additional stiffening bars, for example diagonal, in a horizontal or vertical plane in particular, in order to ensure the resistance and the sufficient rigidity of the system for assembling during the method for assembling the tower.

For example, in FIG. 3, bars 37 can be seen that form a rhombus such that the length of each bar is greater than the largest diameter of the blocks to be assembled.

The system for assembling 10 advantageously comprises a device for guiding 40 the lifting structure 11 in the support structure 12.

Figure 5:
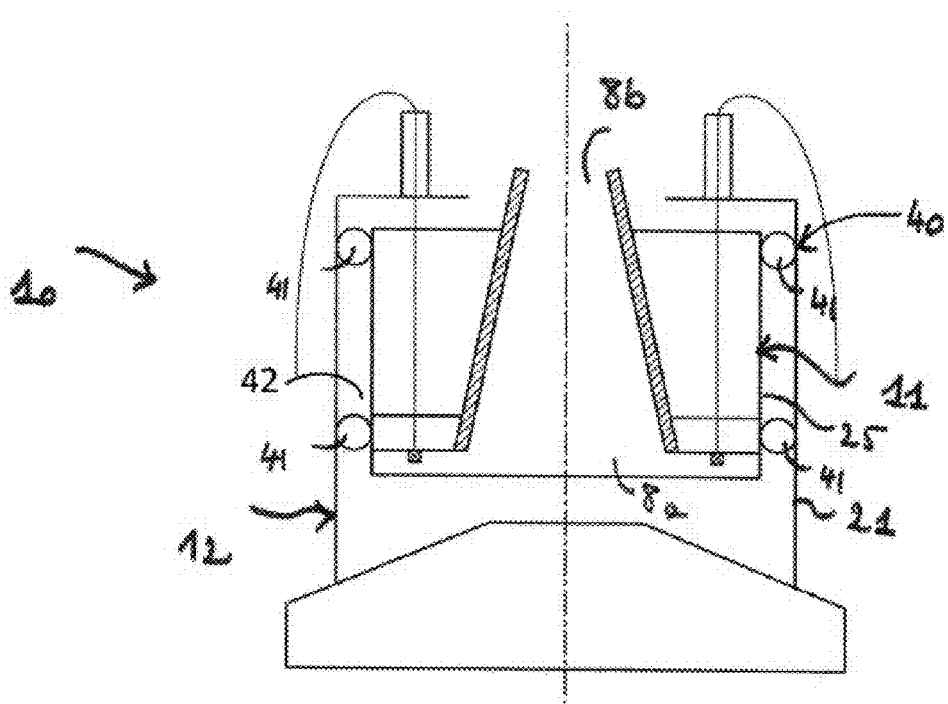
FIG. 5 is a diagrammatical cross-section of the system for assembling according to this invention comprising means for guiding a lifting structure in a support structure.

This device for guiding is shown very diagrammatically in FIG. 5, in the form of at least one element 41 able to slide or roll along a rail 42 with which the support structure 12 is provided preferentially along each pillar 21.

Each element 41 is secured with an upright 25 of the lifting structure 11.

The element 41 can also be a pad, for example of the stainless steel or Teflon type, or of the greased steel type or of the roller type.

The device for guiding 40 provides the stability of the lifting structure during its displacements, in particular due to the fact that the invention allows for the straight guiding of the lifting structure in the support structure.

As can be seen, the device for guiding 40 comprises a first pair of elements 41 arranged in the vicinity of the end 8a of the block 6, opposite one another on either side of the block 6.

The device for guiding 40 comprises a second pair of elements 41 arranged in the vicinity of the other end 8b of the block 6, opposite one another on either side of the block 6.

The distance between the two elements of the pairs located on the same side of the block 6 is chosen in such a way as to form a lever arm.

The structure for lifting 11 and the support structure 12 can be assimilated to two telescopic cages, with the lifting structure sliding by the end 16 of the rods 14 in each pillar 21, with the sliding being stabilised by the device for guiding.

FIGS. 6a to 6e show a method of assembling the tower 2 using the system for assembling 10, the method for assembling comprising a step of:

gripping of a block 6 of the tower 2 by the body for gripping 13 of the lifting structure 11 in the gripping position and displacement of the lifting structure 11 from the gripping position to the holding position of the blocks 6.

As already explained, the system for assembling 10 is arranged in such a way that the direction of displacement of the structure for guiding is a vertical direction.

In the block-holding position, the block 6 secured with the body for gripping 13 is held at a height that is higher than a height of the following block to be assembled.

In the gripping position, the body for gripping is arranged near the base 24, as shall be explained hereinafter.

In the case that is shown but that is not limiting, the direction of displacement of the lifting structure is from bottom to top from the gripping position to the holding position, and from top to bottom from the holding position to the gripping position.

Figure 6A:
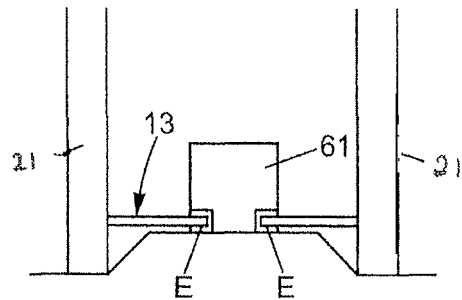
FIG. 6 shows a diagrammatical kinetics of a method for assembling the tower by the system for assembling according to FIG. 1.

As can be seen in FIG. 6a, a first block 61, is arranged in the system for assembling 10, placed on the base 24.

Each recess E of the first block 61 is arranged opposite each beam 14 of the body for gripping, itself in gripping position.

The cage for lifting 11 is positioned at the foot of the cage support 12, at a corresponding height on recesses E.

Each beam 14 is retracted, in such a way that the block 61 is free in the system for assembling 10.

In the step of gripping, the length of each beam 14 is adjusted in such a way as to have a portion of the beam 14 penetrate into the block 61 via the recess E. Then, the length L is held fastened for example by setting in place pins between the two parties as already explained.

At the end of the step of gripping, the block 61 is held firmly by the body for gripping 13.

Then, the lifting structure 11 secured with the block 61 slides in the support structure 12.

Each cable 31 is drawn by its control means 32, which displaces the block 61 towards the top of the pillars 21.

During this displacement, the sliding of the lifting structure is stabilised by the device for guiding.

Figure 6B:
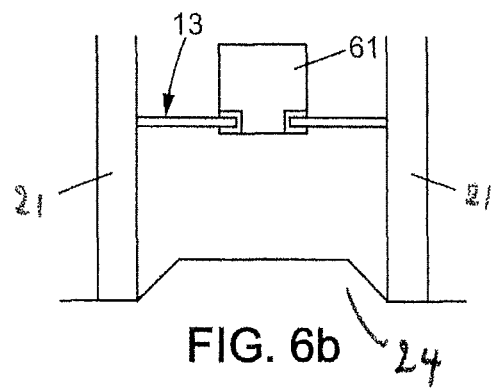

The body for gripping is displaced to the block-holding position 61 at a height that is higher than the height of the following block 62 to be assembled, shown in FIG. 6b.

Figure 6C:
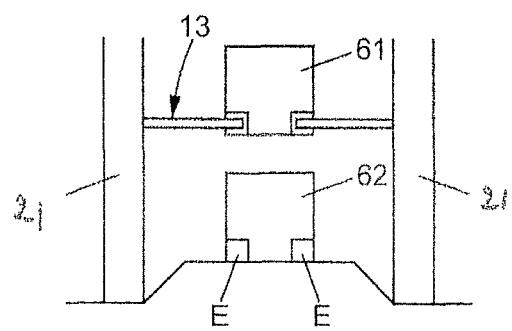

In a following step, the block 62 is placed in the system for assembling 10, under the block 61 secured with the body for gripping 13, as can be seen in FIG. 6c.

Figure 6D:
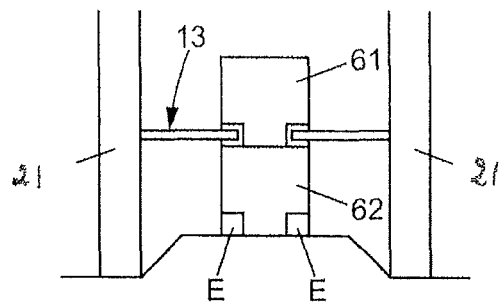

Then, the method comprises a step of displacing the lifting structure 11 from the holding position to the block 62, until the block 61 secured with the body for gripping 13 is placed on the block 62, as can be seen in FIG. 6d.

Then, the method for assembling comprises a step of detaching of the body for gripping 13 and of the block 61, for example by retracting the first portion of rod from each beam 14 outside of the block 61.

Then, the method for assembling comprises a step of displacing the body for gripping to the gripping position, the body for gripping being displaced to the base 24 to the gripping position, as can be seen in FIG. 6d.

Once the block 61 and the block 62 are in contact with one another, the method can include a step of definitive detaching of the blocks, for example by pouring concrete forming a seal between the lower end of the block 61 and the upper end of the block 62.

Figure 6E:
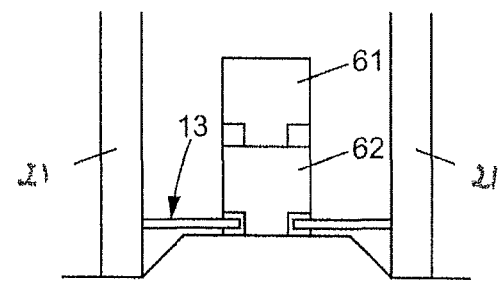

Then, in a new step of gripping, the body for gripping grasps the block 62 secured with the block 61, as shown in FIG. 6e, and displaces it from the gripping position to the holding position.

Figure 6F:
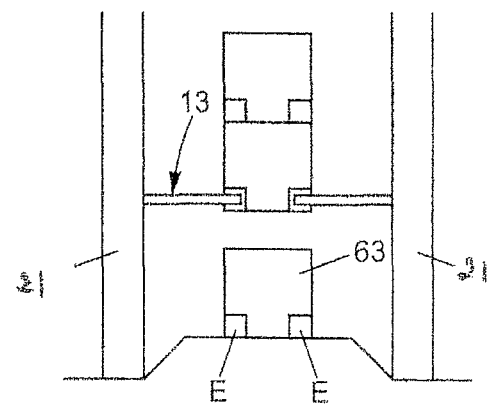

A third block 63 is placed in the system for assembling 10 under the set of blocks 61 and 62 held, as can be seen in FIG. 6f.

The body for gripping then displaces the set of blocks 61 and 62 held until the blocks 62 and 63 are in contact with one another.

The body for gripping is detached from the block 63 and is displaced to its gripping position where it grasps the block 63, sealed beforehand, for example with concrete, to the block 62.

The different steps are repeated until all of the blocks 6 forming the tower 2 are stacked one on top of the other.

It is understood that the method for assembling the tower makes it possible to mount the tower from top to bottom, i.e. the first block mounted is the one intended to be the highest of the tower 2.

As such, the system for assembling and the method for assembling according to the invention make it possible to assemble a tower for a wind generator, without having recourse to cranes with a high lifting capacity while still maintaining a sufficient level of safety.

In particular, the interfaces between the system for assembling and the blocks to be assembled are reduced to the body for gripping, even as a complement to the holding arms, which ensures that the blocks are not damaged during the manipulation thereof.

Moreover, the device for guiding provides for the stability of the straight displacement of the lifting structure in the support structure.

Note that in the embodiments shown, each recess E is arranged in the vicinity of the lower end of each block 6; of course, the invention is not limited to this arrangement.

In addition to the holding arms, it is possible to provide temporary holding means 50 of the tower that is in the process of being assembled, with these temporary means being arranged on the end 23 of each pillar 21, and acting preferably at the time of displacement of the lifting structure to the base 24, from the holding position to the gripping position.

The invention claimed is:

1. A system for assembling a tower for a wind generator consisting of a plurality of blocks, comprising:
   an internal structure for lifting each one of said blocks, and
   an external structure for supporting said lifting structure, the lifting structure able to be moveable in relation to the support structure between a block-gripping position and a block-holding position, the lifting structure comprising a body for gripping each block,
wherein the body for gripping comprises at least one rod able to penetrate into a recess of each block,
wherein said at least one rod can be retracted, said at least one rod extending in a direction perpendicular to the movement of the lifting structure between the block-gripping position and the block-holding position,
wherein said at least one rod is arranged to extend outside the block when the block is disposed inside the lifting structure and the supporting structure, and
wherein the lifting structure comprises:
   at least one holding arm, said at least one holding arm comprising:
      a longitudinal portion, and
      an abutment portion arranged to bear laterally on the block,
said at least one rod and said at least one holding arm constituting the only interfaces between the system and each block.

2. The system for assembling according to claim 1, comprising a plurality of rods arranged substantially in a same plane and two adjacent rods forming between them an angle of about 360° divided by the total number of rods.

3. The system according to claim 1, comprising a plurality of holding arms arranged in the vicinity of a first end of the block and a plurality of holding arms arranged in the vicinity of a second end of the block.

4. The system according to claim 1, comprising a device for guiding the lifting structure in the support structure.

5. The system according to claim 1, wherein the device for guiding comprises at least one element able to slide or roll along a rail of the support structure.

6. The system according to claim 5, wherein the device for guiding comprises two pairs of said elements able to slide or roll along a rail of the support structure, a first pair arranged in the vicinity of a first end of uprights of the lifting structure and a second pair arranged in the vicinity of a second end of said uprights of the lifting structure.

7. The system according to claim 1, wherein the support structure comprises at least two pillars arranged parallel to one another.

8. The system according to claim 1, comprising a motor means of the lifting structure in the structure support.

9. The system according to claim 8, wherein the motor means comprises at least one actuator with a cable or with a threaded bar or a rack device or a large stroke actuator.

10. The system according to claim 9, wherein the motor means comprises four cable actuators, with each cable being connected to one upright of the lifting structure and able to slide in relation to the support structure.

11. The system according to claim 1, wherein the support structure and/or the lifting structure comprises at least one stiffening rod.

12. A method for assembling a tower for a wind generator consisting of a plurality of blocks, using a system for assembling comprising:
a structure for lifting each one of said blocks, and
a structure for supporting said lifting structure, the lifting structure able to be moveable in the support structure between a block-gripping position and a block-holding position, the lifting structure comprising a body for gripping each block, the body for gripping comprising at least one rod able to penetrate into a recess of each block,
wherein said at least one rod can be retracted, said at least one rod extending in a direction perpendicular to a direction of the movement of the lifting structure between the block-gripping position and the block-holding position, and said at least one rod being arranged to extend outside the block when the block is disposed inside the lifting structure and the supporting structure, wherein the lifting structure comprises at least one holding arm, said at least one holding arm comprising a longitudinal portion and an abutment portion arranged to bear laterally on the block,
said at least one rod and said at least one holding arm constituting the only interfaces between the system and each block, the method for assembling comprising a step of:
gripping of a block of the tower resting on an initial location, by the body for gripping the lifting structure in the gripping position, in which said at least one rod extends perpendicularly to the direction movement of the lifting structure and penetrates said recess of the block, and said at least one rod bears against the block,
displacement of the lifting structure from the gripping position to the holding position of the blocks, the lifting structure sliding in the supporting structure,
positioning another block on the same initial location as the previously displaced block,
placing the block that is being gripped on said another block and disengaging the lifting structure,
gripping said another block in the gripping position, in which said at least one rod extends perpendicularly to the direction movement of the lifting structure and penetrates said recess of the block, and said at least one rod bears against the block.

13. The method for assembling according to claim 12, wherein, in the step of displacing, the block is secured with the lifting structure.

14. The method for assembling according to claim 12, wherein the system for assembling is arranged in such a way that the direction of displacement of the structure for guiding is a vertical direction, and wherein, in the block-holding position, the block secured with the body for gripping is held at a height that is higher than the height of the following block to be assembled.

15. The method for assembling according to claim 12, comprising a step of displacing the lifting structure from the holding position to the block deposited during a step of placing, until the block secured with the body for gripping is placed on the deposited block.

16. The method for assembling according to claim 15, comprising a step of detaching the body for gripping and the block secured with the body for gripping during the step of gripping.

17. The method for assembling according to claim 16, comprising a step of displacing the lifting structure to the gripping position.

18. The method for assembling according to claim 12 using the system for assembling according to claim 3, wherein the step of gripping comprises a step of inserting a retractable rod into a recess (E) of the block to be grasped.

19. The method for assembling according to claim 12 using the system for assembling according to claim 3, wherein the step of detaching consists in retracting the retractable rod until the portion of the rod inserted beforehand into the block is arranged outside of the block.

20. The method for assembling according to claim 12 using the system for assembling according to claim 8, wherein during each step of displacing the lifting structure in the support structure, the lifting structure is guided by the device for guiding.

* * * * *